US006775025B1

United States Patent
Robinson et al.

(10) Patent No.: US 6,775,025 B1
(45) Date of Patent: Aug. 10, 2004

(54) SYSTEMS AND METHODS FOR IMAGE REPRODUCTION IN MULTIPLE SESSIONS

(75) Inventors: David C. Robinson, Penfield, NY (US); Michael E. Farrell, Ontario, NY (US)

(73) Assignee: Xerox Corporation, Rochester, NY (US)

( * ) Notice: Subject to any disclaimer, the term of this patent is extended or adjusted under 35 U.S.C. 154(b) by 0 days.

(21) Appl. No.: 09/560,176

(22) Filed: Apr. 28, 2000

(51) Int. Cl.[7] .............................................. G06K 15/00

(52) U.S. Cl. ....................... 358/1.15; 358/1.1

(58) Field of Search ........................ 358/1.1, 1.9, 3.03, 358/3.23, 1.13, 1.14, 1.15, 504, 503, 518, 406, 405; 382/167

(56) References Cited

U.S. PATENT DOCUMENTS 6,643,029 B2 * 11/2003 Kumada et al. ............. 358/1.9

* cited by examiner

Primary Examiner—Arthur G. Evans
(74) Attorney, Agent, or Firm—Oliff & Berridge, PLC

(57) ABSTRACT

A printing machine that records information about conditions of the machine while carrying out a printing request. The recorded resource information includes information about color calibration tables or machine process temperatures that may affect the appearance of a printed job depending on the value of the conditions at a particular time. Subsequently, before carrying out another printing request, the printing machine compares the conditions of a machine, to satisfy the next printing request, to the recorded information to permit an operator to predict whether a job will reprint with acceptable accuracy.

35 Claims, 11 Drawing Sheets

FIG. 8
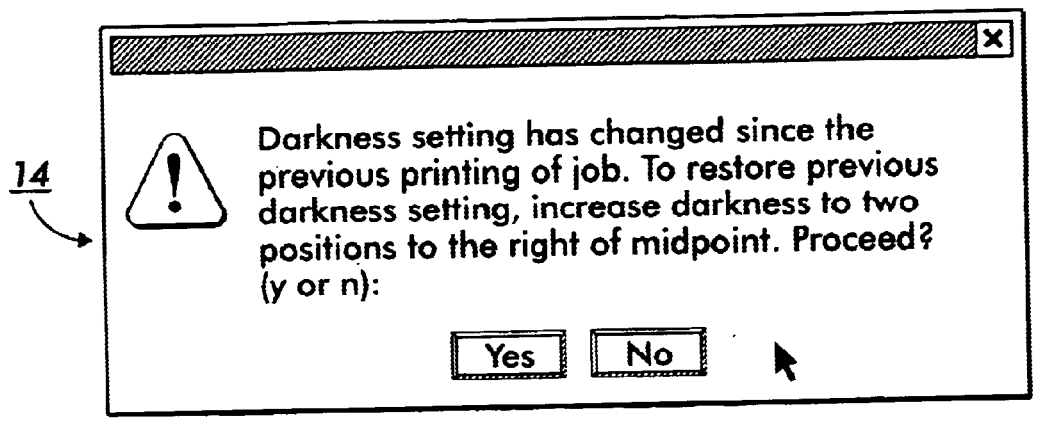
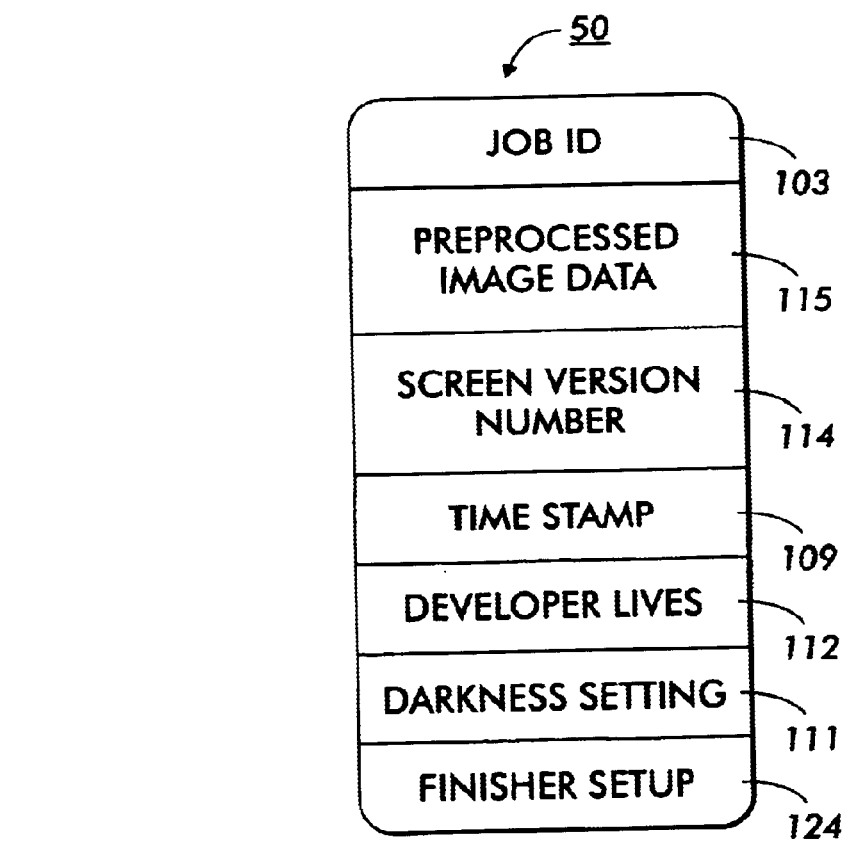
FIG. 9

SYSTEMS AND METHODS FOR IMAGE REPRODUCTION IN MULTIPLE SESSIONS

BACKGROUND OF THE INVENTION

1. Field of the Invention

This invention relates generally to systems and methods for image reproduction in multiple sessions and, more particularly, to an image reproduction system that stores data for reprinting at a later time.

2. Description of Related Art

Some printing systems have time varying features, such as information contents of color calibration tables, that may affect the appearance of a printed job depending on the value of the feature at a particular time.

SUMMARY OF THE INVENTION

It is an object of the present invention to provide an improved printing system that allows the tracking of certain time variant features, permitting an operator to predict whether a job will reprint with acceptable accuracy.

To achieve this and other objects of the present invention, a method comprises printing an image using a printing system; storing a first signal containing the image in association with a second signal representing a property of the printing system during the printing step; subsequently, reading the second signal; comparing the second signal to a signal representing a property of the printing system; and selectively displaying a message depending on a result of the comparing step.

According to another aspect of the present invention, a method comprises recording time variant marking device properties prevailing at the first print time; associating those values with the first submission of a print job; comparing the recorded values with the current values in a reprint situation; and raising an exception when the difference exceeds a tolerance value.

According to yet another aspect of the present invention, there is a processing system for a printing system that prints an image. The processing system comprises a memory configured to store a first signal containing the image in association with a second signal representing a property attribute of the printing system during the printing of the image; circuitry that reads the second signal in response to user input; a correlator responsive to the second signal, and to a signal representing a property of the printing system; and a generator that selectively displays a message depending on an operation of the correlator.

According to yet another aspect of the present invention, there is a processing system for a printing system that prints an image. The processing system comprises means for storing a first signal containing the image in association with a second signal representing a property of the printing system during the printing; means for subsequently reading the second signal from the means for storing; means for comparing the second signal to a signal representing a property of the printing system; and means for selectively displaying a message depending on an operation of the comparing means.

BRIEF DESCRIPTION OF THE DRAWINGS

FIG. 8 is a screen display showing another warning message that may result from the data flow shown in FIG. 4.

FIG. 9 is a diagram showing a data structure in the first preferred system.

The accompanying drawings which are incorporated in and which constitute a part of this specification, illustrate embodiments of the invention and, together with the description, explain the principles and advantages of the invention. Throughout the drawings, corresponding parts are labeled with corresponding reference numbers.

DESCRIPTION OF THE PREFERRED EMBODIMENTS

Figure 1:
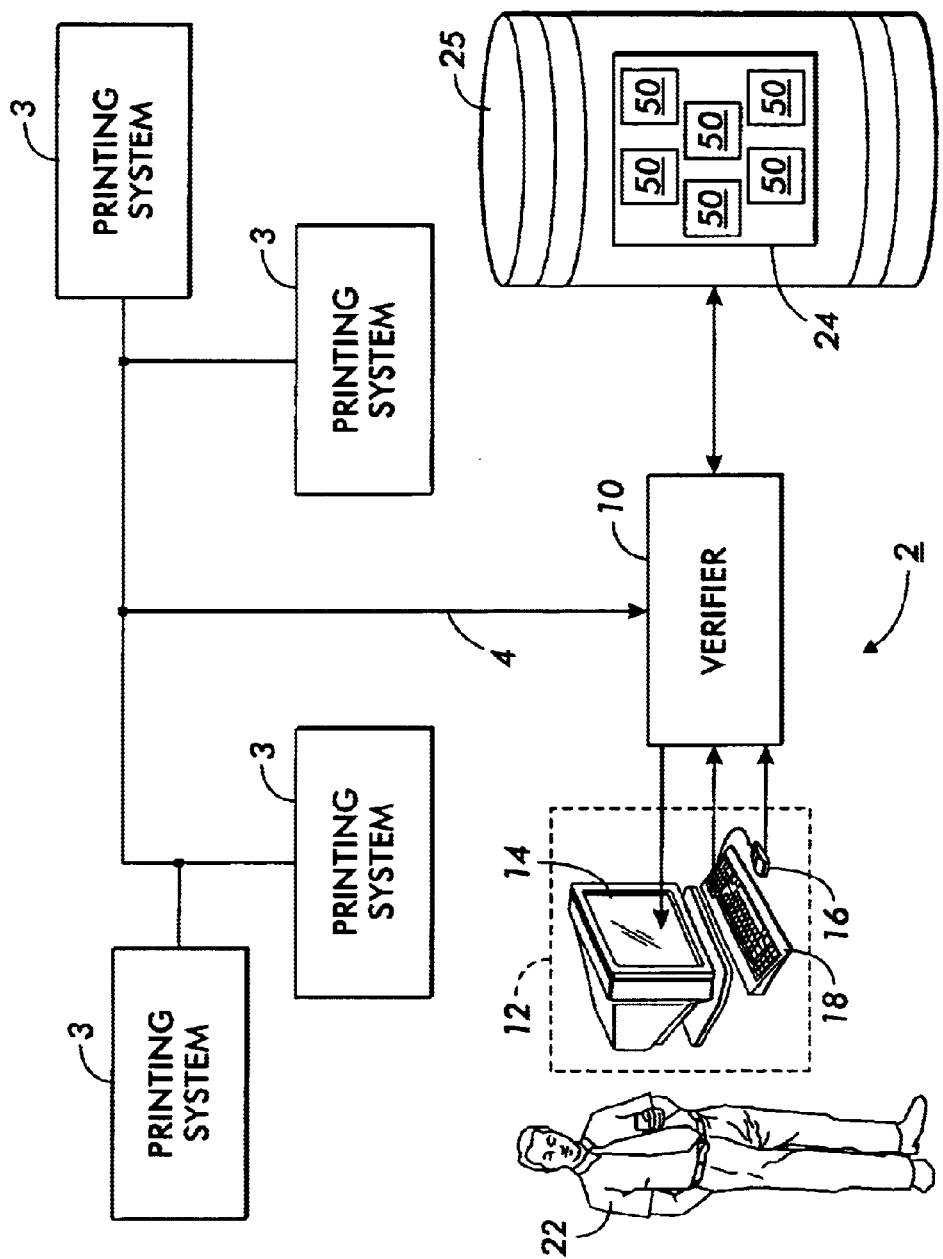
FIG. 1 is an overview, including data structures stored in database 24 on disk memory 25.

FIG. 1 shows system 2 in accordance with a first preferred embodiment of the present invention. System 2 includes user interface 12, printing systems 3, and record structures 50 stored in database 24 on disk memory 25. To reprint a job, verifier 10 receives a job ID from a user interface, and uses the job ID to access a data structure 50. If attributes identified in data structure 50 substantially differ from current attributes in a selected printing system 3, verifier 10 displays a message on an output device, such as CRT 14.

Printing systems 3 send data to verifier 10 via local area network (LAN) cable 4. Verifier 10 is a program invokable by a user at one of the printing systems 3, or by user 22 at user interface 12. Interface 12 includes CRT 14, mouse pointing device 16, and keyboard 18.

Verifier 10 writes to and reads from database 24 stored on magnetic disk memory 25. Verifier 10 includes a memory, instruction in the memory, and a general purpose processor that executes the instructions. Verifier 10 may be invoked from various locations, including user interface 12 or interfaces on printing systems 3.

Figure 2:
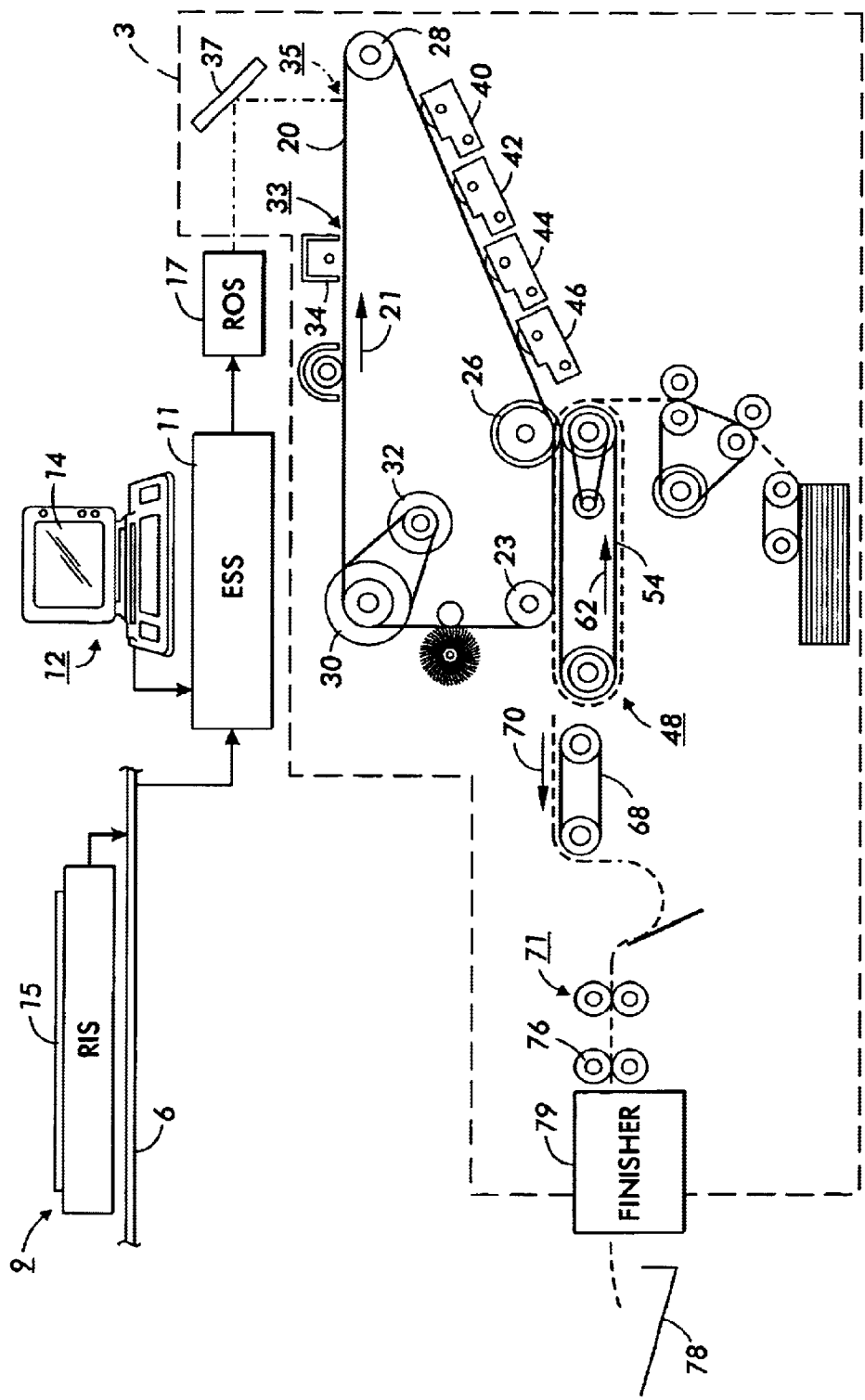
FIG. 2 is an example of a printing system.

FIG. 2 shows a schematic elevational view emphasizing certain features of each printing system 3. Printing system 3 includes a color electrophotographic printing machine. Electronic subsystem (ESS) 11 includes data processing and control electronics to prepare and manage the flow of image data to a raster output scanner (ROS) 17. A user interface (UI) 12 includes circuitry for communicating with ESS 11, enabling an operator to control and monitor various functions. In this Disclosure, the term circuitry encompasses both dedicated hardware and programmable hardware, such as a CPU or reconfigurable logic array, in combination with programming data, such as sequentially fetched CPU instructions or programming data for a reconfigurable logic array.

An operator actuates a user interface to adjust the parameters of a print job. A user interface may include a touch screen, or any other control panel, providing an operator interface with the system.

A multiple color document 15 may be positioned on a raster input scanner (RIS) 9. RIS 9 contains document illumination lamps, optics, a mechanical scanning drive, and a charge coupled device (CCD array) or full width color scanning array. RIS 9 captures the entire image from document 15 and converts the image to a series of raster scan lines, and measures a set of primary color densities, i.e., red, green and blue (RGB) densities, at each point of the document. RIS 9 sends signals representing the scanned image to ESS 11 via network 6.

Documents transmitted to ESS 11 may also come from computer tape, CD ROM, floppy disks, etc.

ESS 11 receives a continuous tone (contone) image and decomposes the contone image to a raster image. ESS 11 transmits signals corresponding to the desired electronic or scanned image to ROS 17 to create the output print image.

ROS 17 preferably includes a laser. ROS 17 illuminates, via mirror 37, the charged portion of a photoconductive belt 20 of printer 3 to achieve a set of subtractive primary latent images. ROS 17 exposes photoconductive belt 20 to record three or four latent images corresponding to the signals transmitted from ESS 11. One latent image is developed with cyan developer material. Another latent image is developed with magenta developer material and the third latent image is developed with yellow developer material. A black latent image may be developed in lieu of, or in addition to, other (colored) latent images. These developed images are transferred to a print sheet in superimposed registration with one another to form a multicolored image on the print sheet.

Photoconductive belt 20 moves in the direction of arrow 21 to advance successive portions of the photoconductive surface sequentially through the various processing stations disposed about the path of movement thereof. Photoconductive belt 20 is entrained about rollers 23, 26, 28 and 30. Motor 32 rotates drive roller 30. As roller 30 rotates, roller 30 advances belt 20 in the direction of arrow 21. Initially, a portion of photoconductive belt 20 passes through a charging station, indicated generally by the reference numeral 33. At charging station 33, a corona generating device 34 charges photoconductive belt 20 to a relatively high, substantially uniform potential. Next, the charged photoconductive surface passes to an exposure station 35. Exposure station 35 receives a modulated light beam corresponding to information derived by RIS 9 having multicolored document 15 positioned thereat. The modulated light beam impinges on the surface of photoconductive belt 20. The beam illuminates the charged portion of photoconductive belt 20 to form an electrostatic latent image. The photoconductive belt is exposed three or more times to record three or more latent images thereon.

Developer units 40, 42, 44, and 46, respectively, apply toner particles of a specific color which corresponds to the complement of the specific color separated electrostatic latent image recorded on the photoconductive surface. The color of each of the toner particles absorbs light within a preselected spectral region of the electromagnetic wave spectrum. The charged areas are then made visible by having developer unit 40 apply green absorbing (magenta) toner particles onto the electrostatic latent image recorded on the photoconductive belt 20. Similarly, developer unit 42 develops a blue separation with blue absorbing (yellow) toner particles, while the red separation is developed by developer unit 44 with red absorbing (cyan) toner particles. Developer unit 46 contains black toner particles and may be used to develop the electrostatic latent image formed from a black and white document as well as color images.

Each developer unit 40, 42, 44, and 46 includes a developer material of magnetizable carrier granules having toner particles adhering triboelectrically thereto. This developer material is constantly moving so as to continually provide the donor with fresh developer material. Development is achieved by bringing the donor of developer material in sufficiently close vicinity of the photoconductive surface.

A sheet transport apparatus 48 moves the sheet into contact with photoconductive belt 20.

As belts 54 move in the direction of arrow 62, the sheet moves into contact with the photoconductive belt, in synchronism with the toner image developed thereon. The sheet remains secured to the sheet gripper so as to move in a recirculating path for three of four cycles. In this way, three or four different color toner images are transferred to the sheet in superimposed registration with one another.

After the last transfer operation, the sheet transport system directs the sheet to a vacuum conveyor 68. Vacuum conveyor 68 transports the sheet, in the direction of arrow 70, to a fusing station, indicated generally by the reference numeral 71, where the transferred toner image is permanently fused to the sheet. Thereafter, the sheet is advanced by a pair of rollers 76 to finisher 79. Finisher 79 includes binding material for fastening multiple sheet together. Sheets processed by finisher 79 then passes to output tray 78 for subsequent removal therefrom by the machine operator.

Additional detail about the mechanical operation of the preferred embodiment of the present invention corresponds to FIG. 1 and accompanying text in Co-owned U.S. Pat. No. 5,850,584, the contents of which are hereby incorporated by reference.

Figure 3:
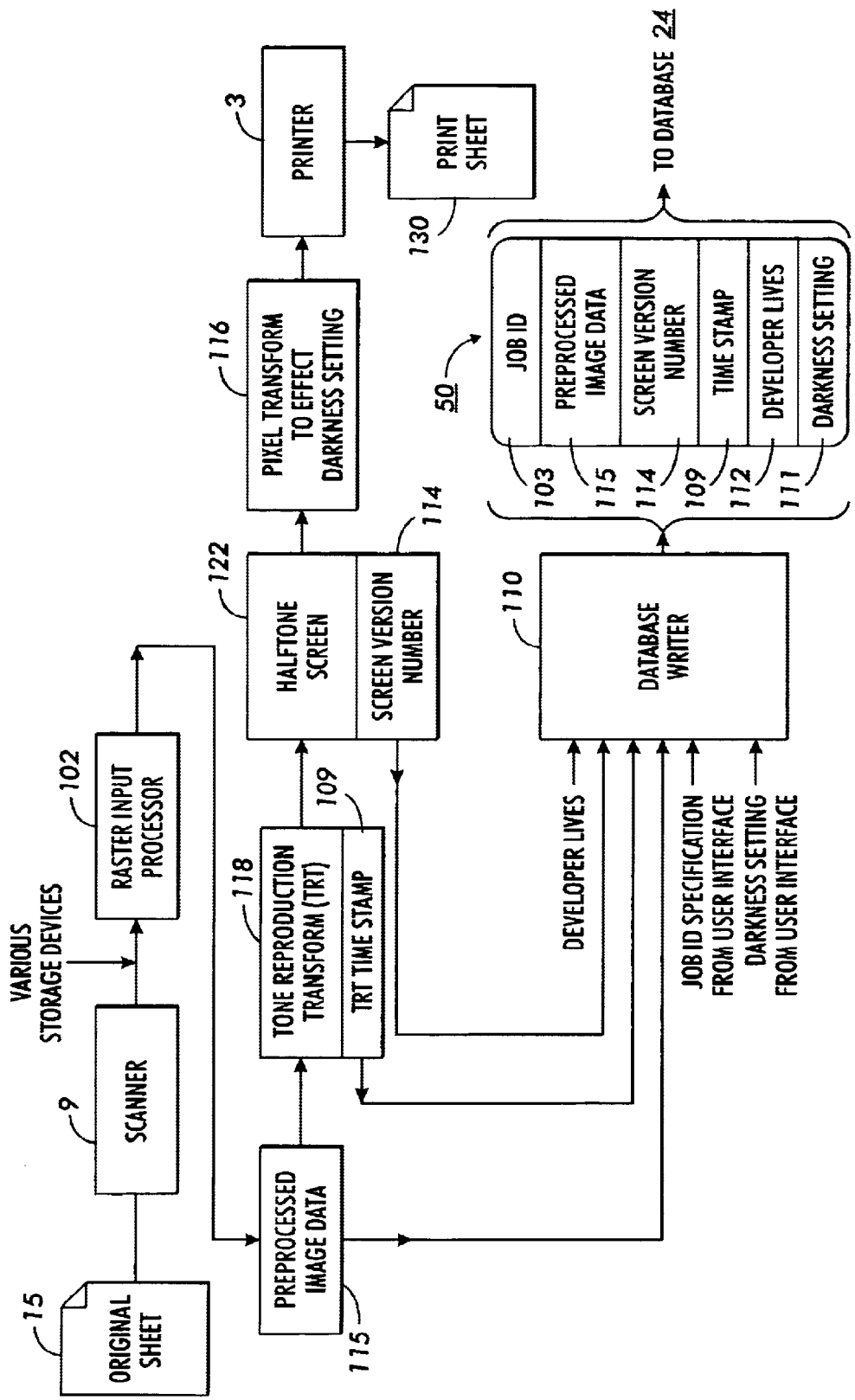
FIG. 3 is a diagram emphasizing a data flow during an initial printing of a job.

FIG. 3 is a diagram emphasizing a data flow in system 2 during an initial printing of a job. Database writer 110 resides in verifier 10. Scanner 9, rastor input processor 102, tone reproduction transforms 118, half-tone screen 122, and pixel transform 116, reside as part of printing system 3 used to print the job initially.

Rastor input processor 102 receives optical signals from scanner 9, or from a storage device, and converts the optical signal into preprocessed image data 115. The time for rastor input processor 102 to convert optical data into preprocessed image data 115 may exceed one minute per page. Preprocessed image data 115 is sometimes called "ready to print" formatted data.

Tone reproduction transform 118 essentially contains a tone reproduction curve. Tone reproduction transform 118 receives image data 115 and converts image data 115 according to the tone reproduction curve. Transform 118 sends the thus processed signal to halftone screen 122.

Halftone screen 122 receives the signal from color transform 118 and converts the signal according to parameters dependant upon the particular model of printer used.

Pixel transform 116 receives a signal from halftone screen 122 and changes the pixels to effect a darkness setting selected by the user. Pixel transform 116 sends the thus processed data to printer 3. Printer 3 thus prints sheet 130.

Figure 4:
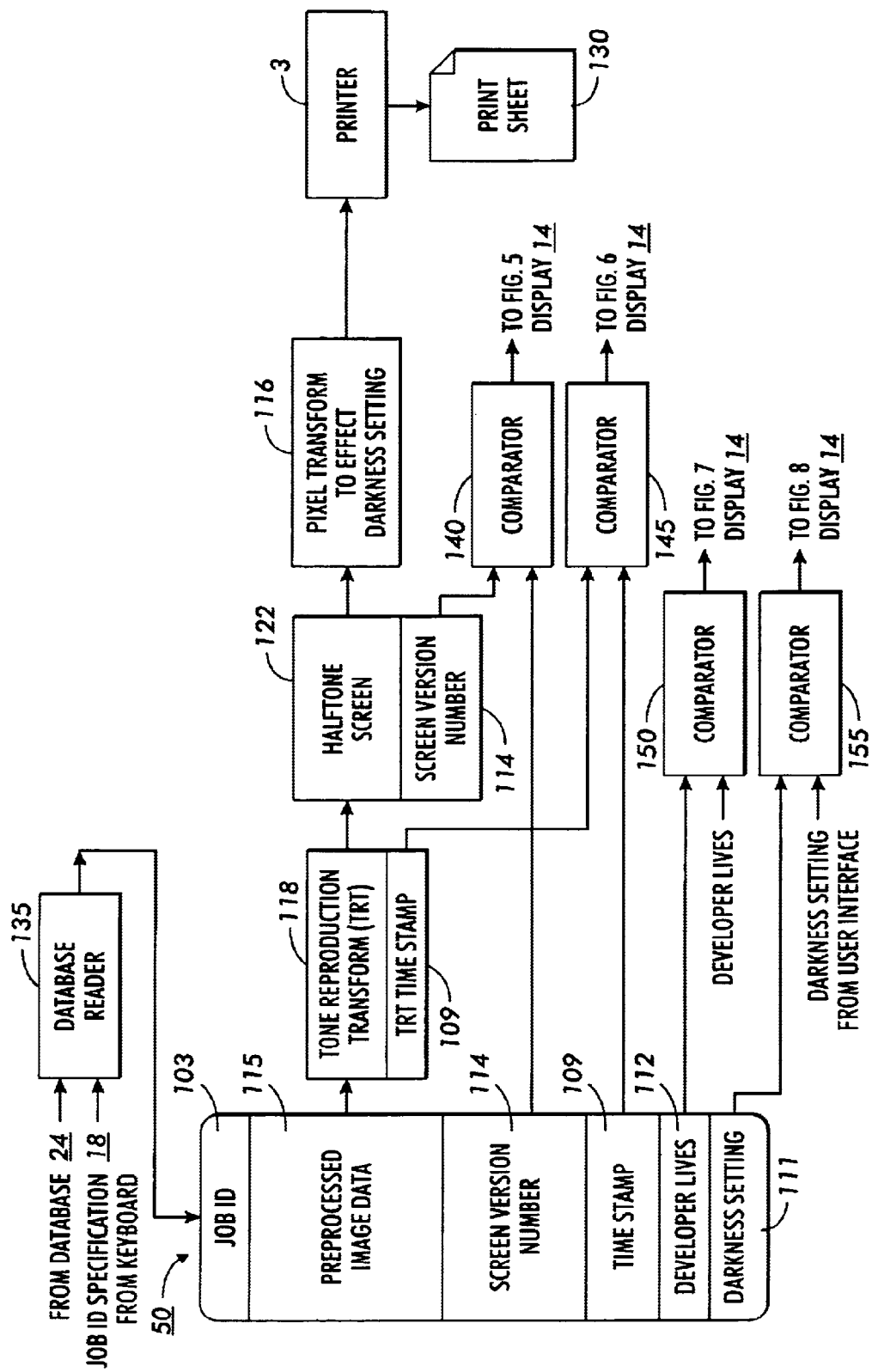
FIG. 4 is a is a diagram emphasizing a data flow during a reprinting of the job.

Database writer 110 constructs a data structure 50. FIGS. 3 and 4 show some of the contents of data structure 50. Database writer 110 constructs structure 50 to store preprocessed image data 115 in association with a job ID 103 received from user interface 12. Database writer 110 also records various time variant parameters, of the particular printing system 3 used to print the job, in association with preprocessed image data 115. These time variant parameters include a time stamp 109 identifying the time that tone reproduction transform 118 was generated, by a calibration operation for example. These time variant parameters also include a darkness setting 111 selected by the user, and a screen version number 114 identifying the halftone screen 122 in effect during the printing of print sheet 130.

These time variant parameters also include developer lives 112 with respective values indicating respective efficiencies of developer units 40, 42, 44, and 46. The developer lives input to database writer 110 may include a signal indicating a quantity in developer unit 40, a signal indicating a quantity of developer in developer unit 42, a signal indicating a quantity of developer in developer unit 44, and a signal indicating a quantity of developer in developer unit 46. Each of these developer quantity signals may originate from an electronic measurement device that measures the developer quantity. Alternately, for example, these signals may originate from a counter that counts the number of copy sheets printed since the last time developer was replenished.

FIG. 4 is a diagram emphasizing a data flow in system 2 before reprinting of the job. Database reader 135 and comparators 140, 145, 150, and 155 reside in verifier 10.

Figure 5:
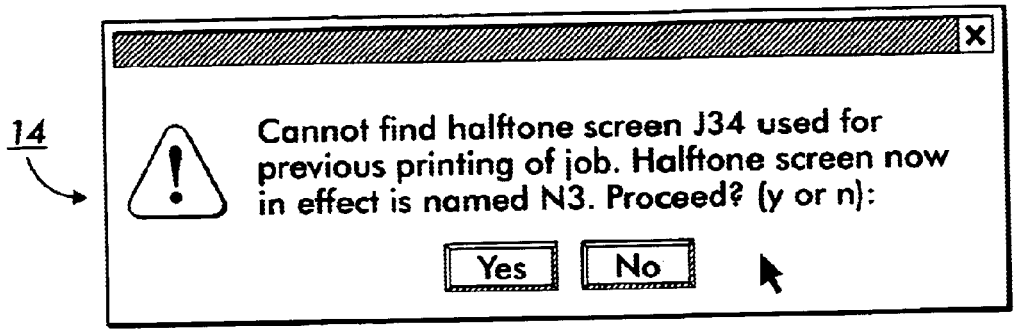
FIG. 5 is a screen display showing a warning message that may result from the data flow shown in FIG. 4.

Database reader 135 receives a job ID specification and a printer system selection specification from a user interface. After system 2 fetches data structure 50 having the job ID specified by user interface 12, comparator 140 compares the screen version number 114 from structure 50, reflecting the screen number in effect in the previous printing of the job, to the current screen version number 114 of a selected printing system 3. If comparator 140 detects that these two screen version numbers are not equal, comparator 140 prints a warning message on CRT 14, as shown in FIG. 5.

Figure 6:
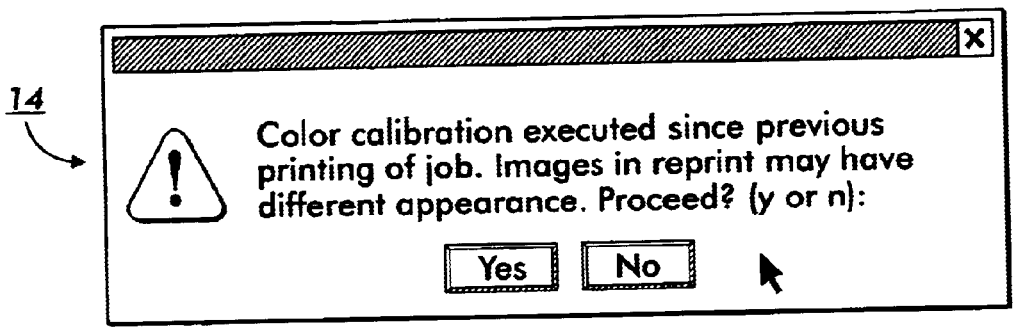
FIG. 6 is a screen display showing another warning message that may result from the data flow shown in FIG. 4.

After system 2 fetches data structure 50 having the job ID specified by user interface 12, comparator 145 compares the tone reproduction (TRT) time stamp 109 from structure 50, reflecting the tone reproduction transform in effect in the previous printing of the job, to the current TRT time stamp 109 of the selected printing system 3. If comparator 145 detects that these two screen version numbers are not equal, comparator 145 prints a warning message on CRT 14, as shown in FIG. 6.

Figure 7:
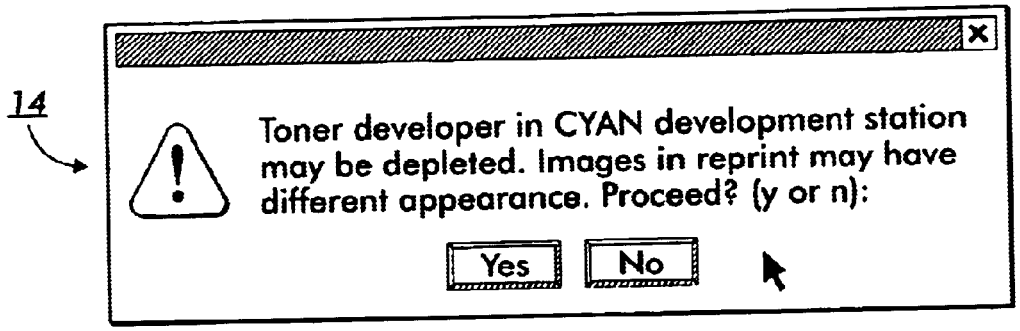
FIG. 7 is a screen display showing another warning message that may result from the data flow shown in FIG. 4.

After system 2 fetches data structure 50 having the job ID specified by user interface 12, comparator 150 compares the developer information 112 from structure 50, reflecting the condition of developers during the previous printing of the job, to the current developer information of the selected printing system 3. If comparator 150 detects that these two sets of developer information have substantial differences, comparator 150 prints a warning message on CRT 14, as shown in FIG. 7.

After system 2 fetches data structure 50 having the job ID specified by user interface 12, comparator 155 compares the darkness setting 111 from structure 50, reflecting the darkness setting in effect in the previous printing of the job, to the current darkness setting of the selected printing system 3. If comparator 155 detects that these two darkness settings are not equal, comparator 155 prints a warning message on CRT 14, as shown in FIG. 8.

Each of comparators 140, 145, 150, and 155 is a subprocedure of instructions executed by the general purpose processor of verifier 10.

FIG. 9 shows data structure 50, constructed and written by database writer 110 and read by database reader 135, in more detail. In addition to the fields described above, data structure 50 includes finisher setup 124, recording conditions in finisher 79. For example, finisher setup 124 could include information about the temperature at which any coating process was performed.

Figure 10A:
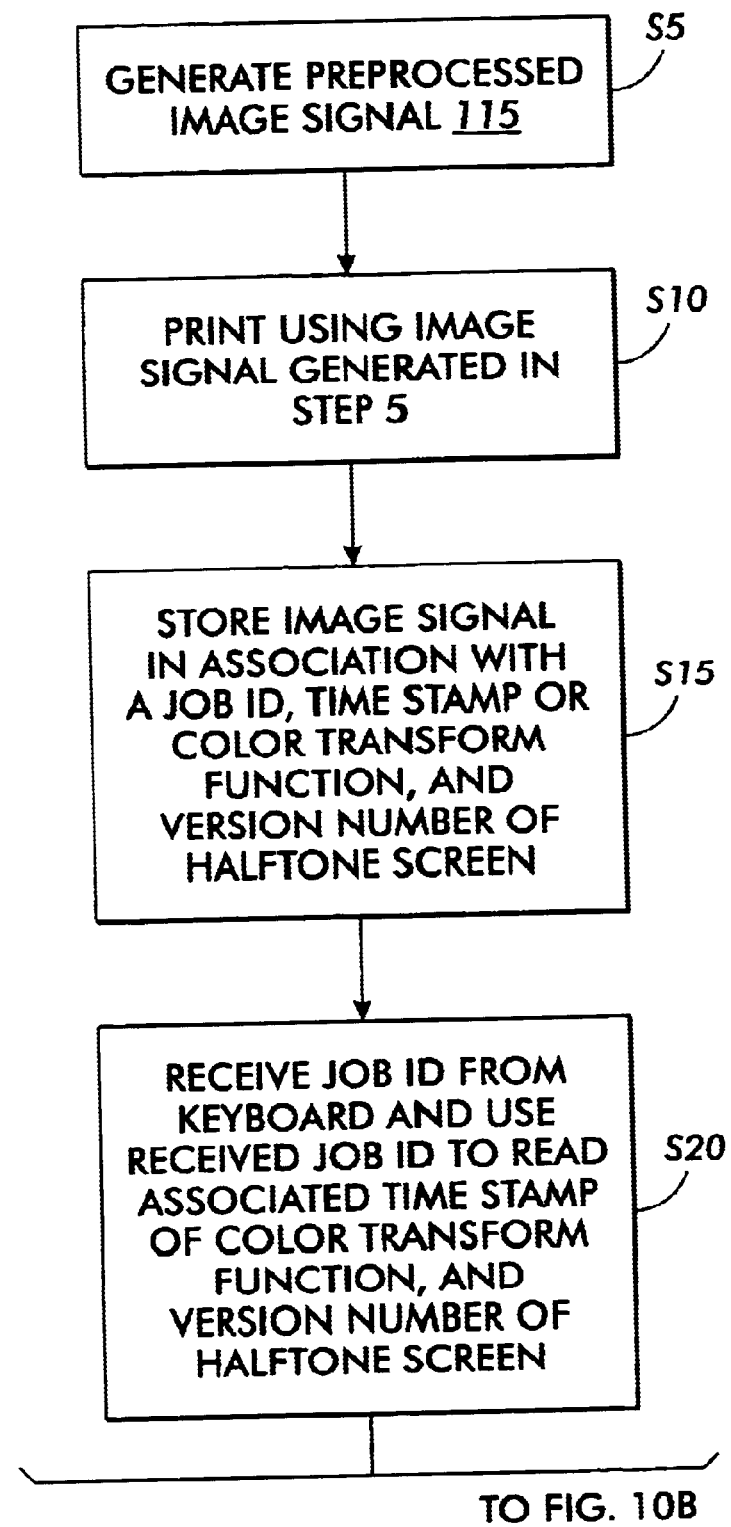
FIGS. 10A, 10B and 10C are a flow chart showing a process performed by system 1.
Figure 10B:
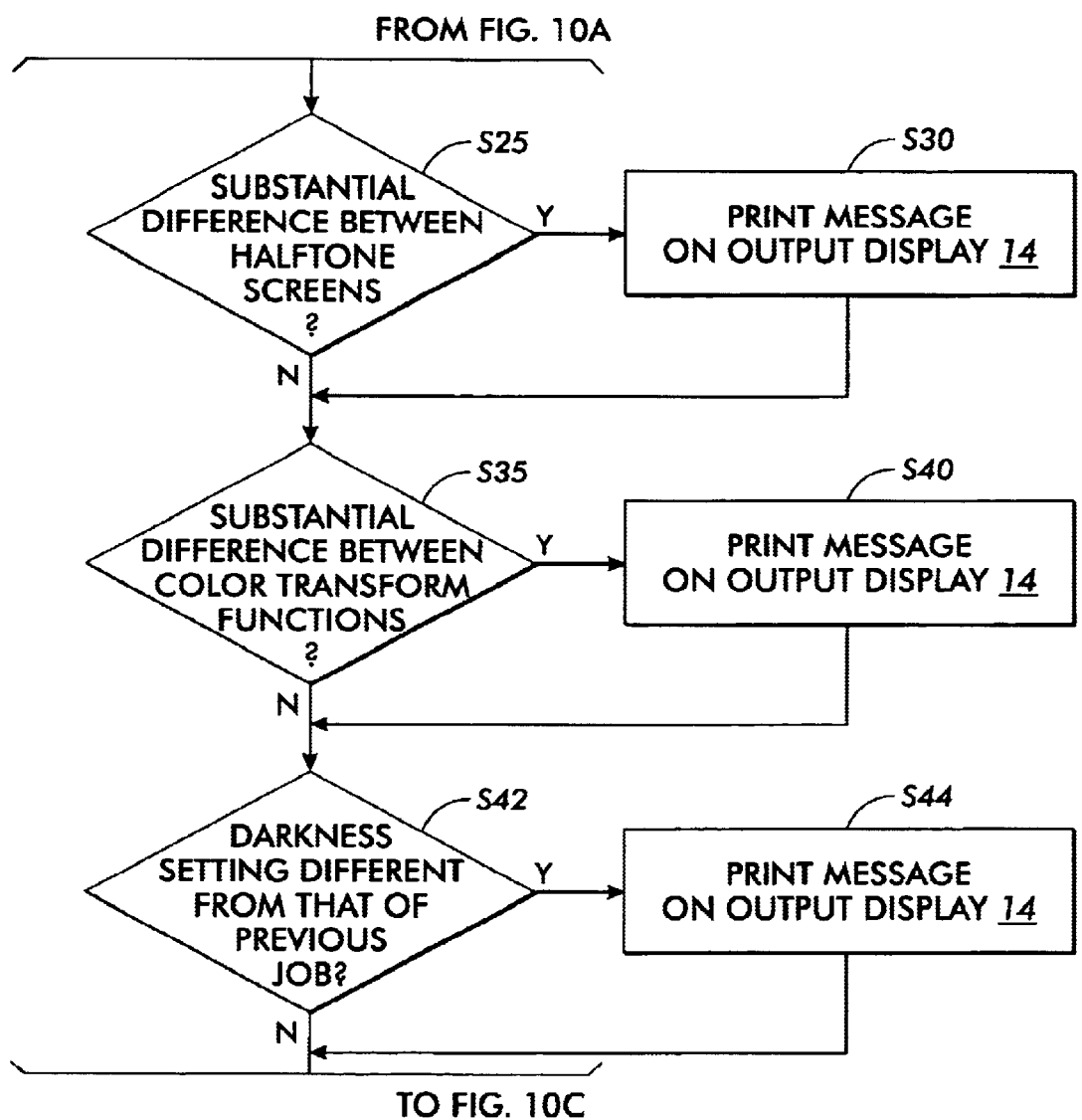
Figure 10C:
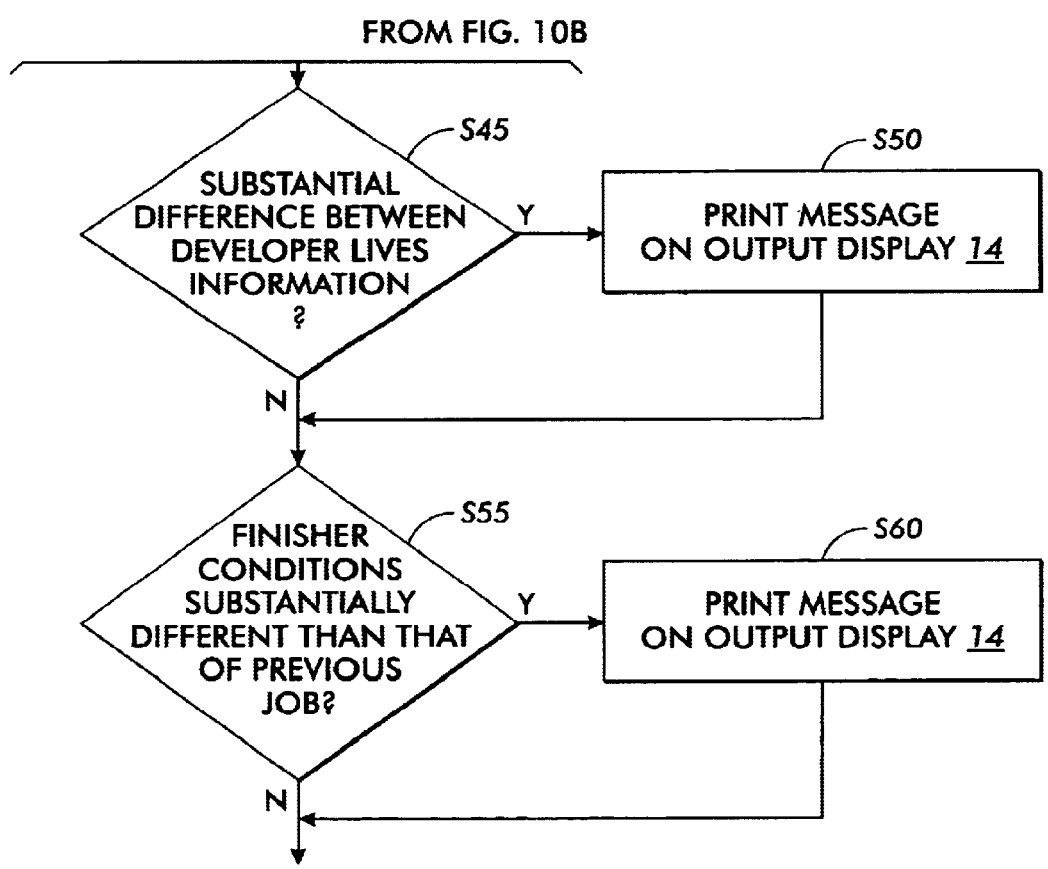

FIGS. 10A, 10B, 10C shows a process performed by system 2. Rastor input processor 102 generates preprocessed image signal 115 (step 5). Time variant parameters including pixel transform 116, tone reproduction transform 118, halftone screen 122, effect the printing on print sheet 130, using image data 115. (Step 10). Database writer 110 stores image data 115 in association with some information about the time variant parameters (step 15).

Subsequently, when a user wishes to reprint the job, database writer 135 receives a job ID and uses the received job ID to read a data structure 50 from disk 25 (step 20). Verifier 10 compares the read screen version number recorded in data structure 50 to the current version number in the selected printing system 3 to detect substantial differences (step 25). If step 25 detects substantial differences, verifier 10 effects the printing of an informational or warning message on CRT display 14. (Step 30).

Verifier 10 compares the tone reproduction transform recorded in data structure 50 to the current tone reproduction transform in the selected printing system 3, to detect substantial differences (step 35). If step 35 detects substantial differences, verifier 10 effects the printing of an informational or warning message on CRT display 14. (Step 40).

Verifier 10 compares the darkness setting recorded in data structure 50 to the current darkness setting in the selected printing system 3, to detect substantial differences (step 42). If step 42 detects substantial differences, verifier 10 effects the printing of an informational or warning message on CRT display 14. (Step 44).

Verifier 10 compares the developer lives information recorded in data structure 50 to the current developer conditions in the selected printing system 3, to detect substantial differences (step 45). If step 45 detects substantial differences, verifier 10 effects the printing of an informational or warning message on CRT display 14. (Step 50).

Verifier 10 compares the finisher conditions recorded in data structure 50 to the current finisher conditions in the selected printing system 3, to detect substantial differences (step 55). If step 55 detects substantial differences, Verifier 10 effects the printing of an informational or warning message on CRT display 14. (Step 60).

Figure 11:
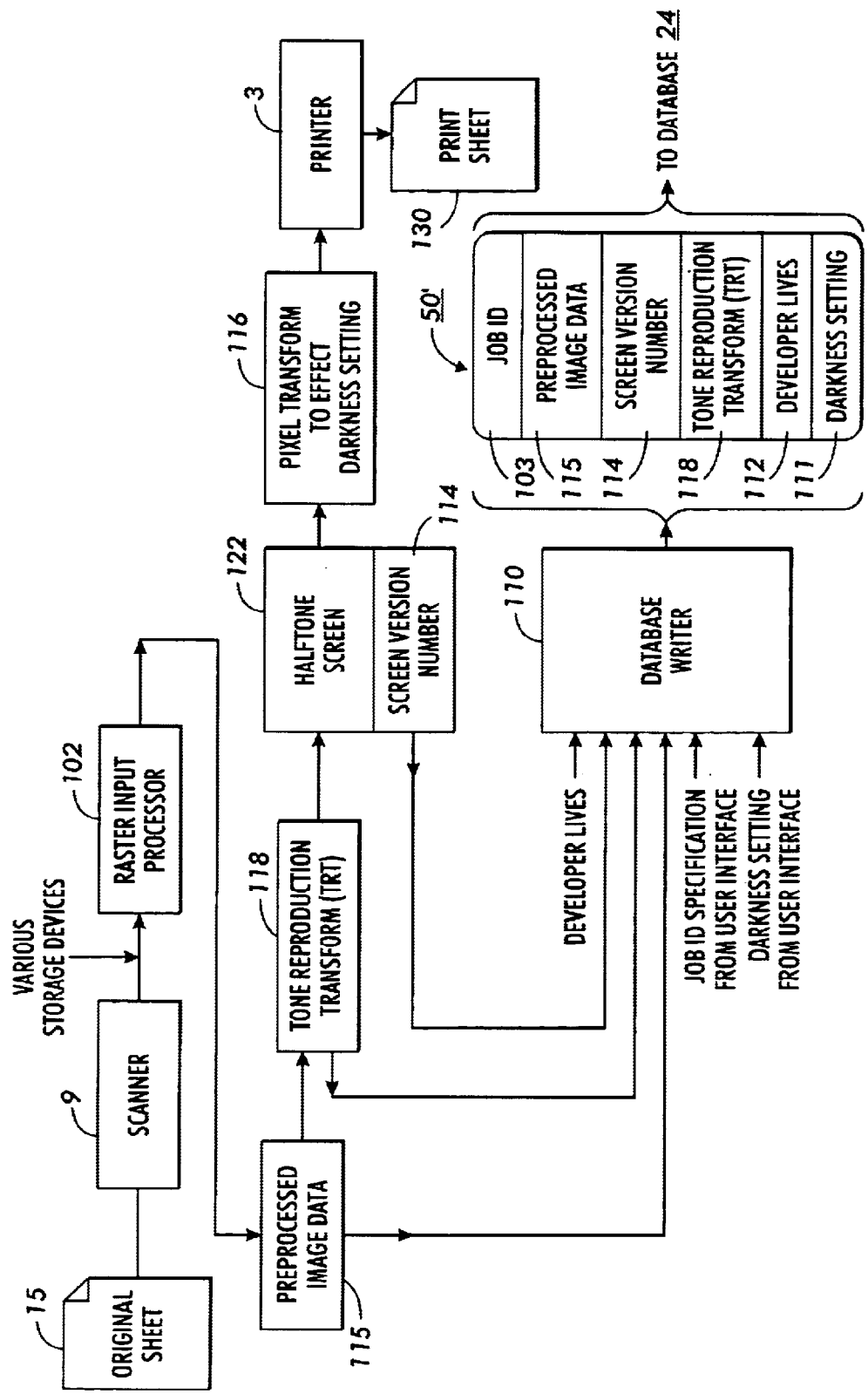
FIG. 11 is a diagram emphasizing a data flow in a second preferred embodiment of the present invention.

FIG. 11 is a diagram emphasizing a data flow in a second preferred system. Instead of writing a time stamp for the tone reproduction transform, as was performed in the first preferred system, the second preferred system writes the tone reproduction transform 118 itself into data structure 50.

Figure 12:
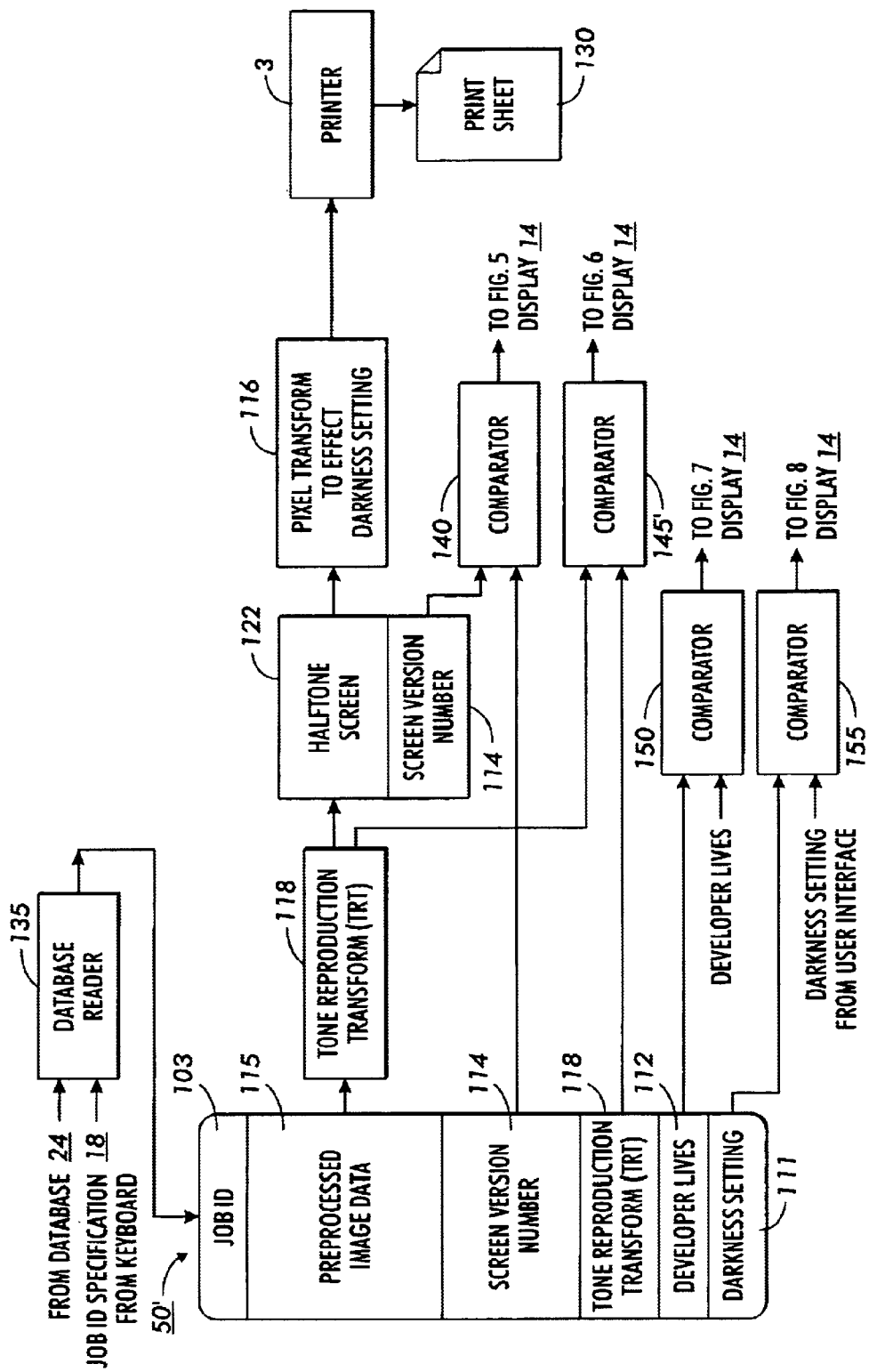
FIG. 12 is a diagram emphasizing another data flow in the second preferred embodiment of the present invention.

FIG. 12 is a diagram emphasizing a data flow in the second preferred system during a reprinting of the job. Comparator 145' compares one or more coefficients of tone reproduction transform 118, recorded in data structure 50', to the tone reproduction transform currently in effect in the selected printing system 3. If one coefficient differs by more than a certain tolerance value, comparator 145' causes the printing of a warning message.

In summary, a preferred printing system 3 prints an image on print sheet 130. Database writer 110 stores image data 115 on disk 50. Image data 115 is one type of signal containing the image printed on sheet 130. Database writer 110 also stores, in association with image data 115, a signal representing a time varying attribute of printing system 3. Subsequently, verifier 10 reads the stored attributes and compares the read attributes to current attributes in a selected printing system 3. One of various types of comparators may then selectively display a warning message on CRT 14.

Thus, a preferred printing machine records information about conditions of the machine while carrying out a printing request. The recorded resource information includes information about color calibration tables or machine process temperatures that may affect the appearance of a printed job depending on the value of the conditions at a particular time. Subsequently, before carrying out another printing request, the printing machine compares the conditions of a machine, to satisfy the next printing request, to the recorded information to permit an operator to predict whether a job will reprint with acceptable accuracy.

Of course the systems and method described above may optionally be practiced with many other types of systems and methods related to image reproduction. For example, the systems and methods above may optionally be practiced with features described in copending application of MICHAEL E. FARRELL, LESLIE E. WAGGETT, DAVID C. ROBINSON, AND LOUIS O. PEPIN for PRINTING SYSTEMS AND METHODS, filed concurrently with the instant application, the contents of which is herein incorporated by reference.

Additional advantages and modifications will readily occur to those skilled in the art. For example, attribute information may be stored in alternate types of data structures, including contiguous records, or associated data distributed among separated locations on a storage device or in a network. The invention in its broader aspects is therefore not limited to the specific details, representative apparatus, and illustrative examples shown and described. Accordingly, departures may be made from such details without departing from the spirit or the scope of applicants' general inventive concept. The invention is defined in the following claims.

What is claimed is:

1. A method comprising:
   printing an image using a printing system;
   storing a first signal containing the image in association with a second signal representing a time varying property of the printing system during the printing step;
   subsequently, reading the second signal;
   comparing the second signal to a signal representing a property of the printing system after reading the second signal; and
   selectively displaying a message depending on a result of the comparing step.

2. The method of claim 1 wherein the signal representing the property includes a time at which the property existed.

3. The method of claim 1 wherein the signal representing the property includes a part of the property.

4. The method of claim 1 wherein the property includes a color transformation function.

5. The method of claim 1 wherein the property includes a darkness setting.

6. The method of claim 5 wherein the darkness setting is effected with a pixel transform.

7. The method of claim 1 wherein the property includes a color transformation function and the comparing step is responsive to a coefficient of the color transformation function.

8. The method of claim 1 wherein the second signal includes an identifier for a color transformation function.

9. The method of claim 8 wherein the identifier includes a time at which the color transformation existed.

10. The method of claim 1 wherein the property includes a halftone screen.

11. The method of claim 1 wherein the second signal includes an identifier for a halftone screen.

12. The method of claim 1 wherein the comparing step is responsive to a tolerance value received from a user input device.

13. A method comprising:
    recording a first signal containing an image in association with a second signal representing time variant marking device properties prevailing at a first print time;
    associating those recorded values of the time variant marking device properties with a first submission of a print job;
    comparing the recorded values with the current values during reprinting of the print job; and
    selectively displaying a message when the difference between the recorded values and the current values exceeds a tolerance value.

14. A processing system for a printing system that prints an image, the processing system comprising:
    a memory configured to store a first signal containing the image in association with a second signal representing a property attribute of the printing system during the printing of the image;
    circuitry that reads the second signal in response to user input;
    a correlator responsive to the second signal, and to a signal representing a property of the printing system; and
    a generator that selectively displays a message depending on an operation of the correlator.

15. The system of claim 14 wherein the signal representing the property includes a time at which the property existed.

16. The system of claim 14 wherein the signal representing the property includes a part of the property.

17. The system of claim 14 wherein the property includes a darkness setting.

18. The system of claim 14 wherein the property includes a color transformation function.

19. The system of claim 14 wherein the property includes a color transformation function and the correlator is responsive to a coefficient of the color transformation function.

20. The system of claim 14 wherein the second signal includes an identifier for a color transformation function.

21. The system of claim 20 wherein the identifier includes a time at which the color transformation existed.

22. The system of claim 14 wherein the property includes a halftone screen.

23. The system of claim 14 wherein the second signal includes an identifier for a halftone screen.

24. The system of claim 14 wherein the correlator is responsive to a tolerance value received from a user input device.

25. A processing system for a printing system that prints an image, the processing system comprising:
    means for storing a first signal containing the image in association with a second signal representing a time varying property of the printing system during the printing;
    means for subsequently reading the second signal from the means for storing;
    means for comparing the second signal to a signal representing a property of the printing system after the second signal is read from the means for storing; and means for selectively displaying a message depending on an operation of the comparing means.

26. The system of claim 25 wherein the signal representing the property includes a time at which the property existed.

27. The system of claim 25 wherein the signal representing the property includes a part of the property.

28. The system of claim 25 wherein the property includes a darkness setting.

29. The system of claim 25 wherein the property includes a color transformation function.

30. The system of claim 25 wherein the property includes a color transformation function and the comparing is responsive to a coefficient of the color transformation function.

31. The system of claim 25 wherein the second signal includes an identifier for a color transformation function.

32. The system of claim 31 wherein the identifier includes a time at which the color transformation existed.

33. The system of claim 25 wherein the property includes a halftone screen.

34. The system of claim 25 wherein the second signal includes an identifier for a halftone screen.

35. The system of claim 25 wherein the means for comparing is responsive to a tolerance value received from a user input device.

* * * * *